United States Patent [19]

Subramaniam

[11] Patent Number: 5,596,038
[45] Date of Patent: Jan. 21, 1997

[54] HYDROGEL HAVING A SILICON-BASED CROSSLINKER FOR BIOSENSORS AND ELECTRODES

[75] Inventor: Raj Subramaniam, Fremont, Calif.

[73] Assignee: Physiometrix, Inc., Sunnyvale, Calif.

[21] Appl. No.: 243,230

[22] Filed: May 16, 1994

[51] Int. Cl.⁶ .................. C08F 222/02; C08F 220/56; C08K 5/05
[52] U.S. Cl. .......... 524/547; 524/388; 524/806; 526/279
[58] Field of Search .................. 524/547, 806, 524/388

[56] References Cited

U.S. PATENT DOCUMENTS

| | | |
|---|---|---|
| 2,985,631 | 5/1961 | Jones ............................ 526/279 |
| 4,109,648 | 8/1978 | Larke et al. . |
| 4,458,696 | 7/1984 | Larimore . |
| 4,515,162 | 5/1985 | Yamamoto et al. . |
| 4,777,954 | 10/1988 | Keusch et al. . |

*Primary Examiner*—Christopher Henderson
*Attorney, Agent, or Firm*—Flehr, Hohbach, Test, Albritton & Herbert

[57] ABSTRACT

The invention provides novel organic polymer hydrogels comprising oligo(polyhydroxylalkyl)silylmethacrylate, particularly tetraethylene glycol α–ω bis(dimethoxysilylpropylmethacrylate), crosslinkers for use in constructing organic polymers, especially polyacrylates, particularly polyacrylamides. A preferred class of polymers are particularly suited to coating biomedical electrodes and sensors. Generally, these polymers are formed from a solution of 2–50% (w/v) monomer and 0.1–20% (w/v) crosslinker and 20–98% (w/v) an electrically conductive solution of a salt in water or a water-miscible solvent. These usually acrylic polymers generally have bulk resistivity of less than 1000 Ohms at 1 kHz, tack of between 20 and 150 g, hardness between 100 g and 500 g, 10 to 70% stress relaxation, thermal stability over a −40° to 70° C. range, structural stability to saturating salt concentrations, and are capable of between 150 and 1500% elongation. Coatings of these polymers are chemically compatible with Al, Sn, Ag and Au conductors in biomedical electrodes and sensors.

12 Claims, 2 Drawing Sheets

5,596,038

HYDROGEL HAVING A SILICON-BASED CROSSLINKER FOR BIOSENSORS AND ELECTRODES

INTRODUCTION

This invention relates to organic polymer crosslinkers, organic polymers and medical electrodes and sensors incorporating such polymers.

Medical electrodes and sensors often comprise a conductor coated or covered with a material which interfaces between the conductor and the target site. Where the target site is human skin, various electrically conductive hydrogels have proved convenient interfacing materials. U.S. Pat. Nos. 4,109,648, 4,515,162, 4,458,696 and 4,777,954 collectively disclose a number of medical electrodes coated with conductive adhesives.

A preferred electrode coating will provide documented biocompatibility, thermal stability, excellent electrical properties, durable adhesiveness, strong cohesiveness, unlimited castability, optimal conformability and softness, low susceptibility to drying, and chemical compatibility with conductor substrates. Unfortunately, none of the prior art electrodes provide near optimum characteristics.

SUMMARY OF THE INVENTION

The invention provides novel organic polymers comprising a crosslinker of the general formula:

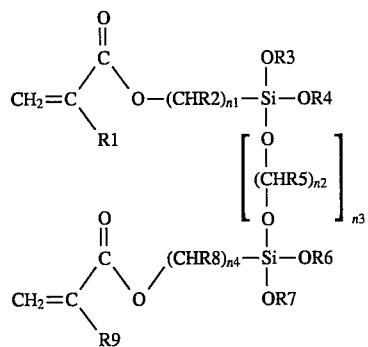

wherein each of R1–R9 comprises a one to four carbon alkyl group or hydrogen and each of n1–n4 is an integer from one to five, inclusive. Generally, at least one R1–R9 alkyl group is substituted with an amine, hydroxyl, or carboxyl group. Preferred crosslinkers are at least 0.1% (w/v) soluble in water. In a particularly preferred embodiment, R1, R3, R4, R6, R7 and R8 are each methyl groups, R2, R5 and R8 are each hydrogens, n1 and n4 are each three, n2 is two, and n3 is four.

The crosslinkers of the invention find use in constructing organic polymers, especially polyacrylates, particularly polyacrylamides. A preferred class of polymers are particularly suited to coating biomedical electrodes and sensors. Generally, these polymers are formed from a solution of 2–50% (w/v) monomer and 0.1–20% (w/v) crosslinker and 20–98% (w/v) an electrically conductive solution of a salt in water and/or a water-miscible solvent.

These usually acrylic polymers and generally have bulk resistivity of less than 1000 Ohms at 1 kHz, tack of at least 20 g, hardness between 30 g and 500 g, 10 to 100% stress relaxation, thermal stability over a −40° to 70° C. range, structural stability to saturating salt concentrations, and are capable of at least 300% elongation. Coatings of these polymers are chemically compatible with Al, Sn, Ag and Au conductors in biomedical electrodes and sensors.

The invention also provides methods of using the subject crosslinkers, polymers and electrodes, e.g. the subject polymers are interposed between the skin of a patient and an electrical conductor to improve electrical current transfer.

Two electrodes (hydrogel coated silver-silver chloride conductors; hydrogel composition: 15.13% Acrylamide, 1.89% tetraethylene glycol α–ω bis(dimethoxysilylpropylmethacrylate), 7.21% Magnesium chloride, 37.81% Glycerol, 0.08% Ammonium persulfate (APS), 0.08% TEMED and 37.81% Water) were placed face to face and the impedance was measured as a function of time exposed to air. A radiofrequency sign wave was imposed on the electrodes and the impedance measured with a Spectrum Analyzer (Stanford Research Systems)

Figure 2:
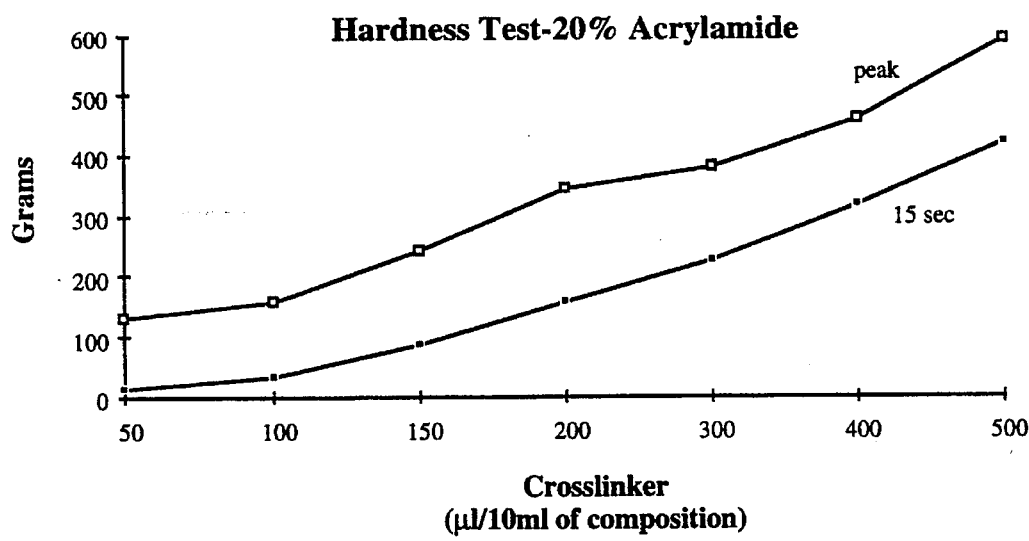

FIG. 2 Hardness Data

Gels were cast in scintillation vials and hardness measured with an Amtek pressure gauge with a 4.6 square cm probe. The probe was pressed to the gel to a 0.2" depth for 15 seconds and then released. The force after 15 seconds and the peak force were recorded.

Figure 3:
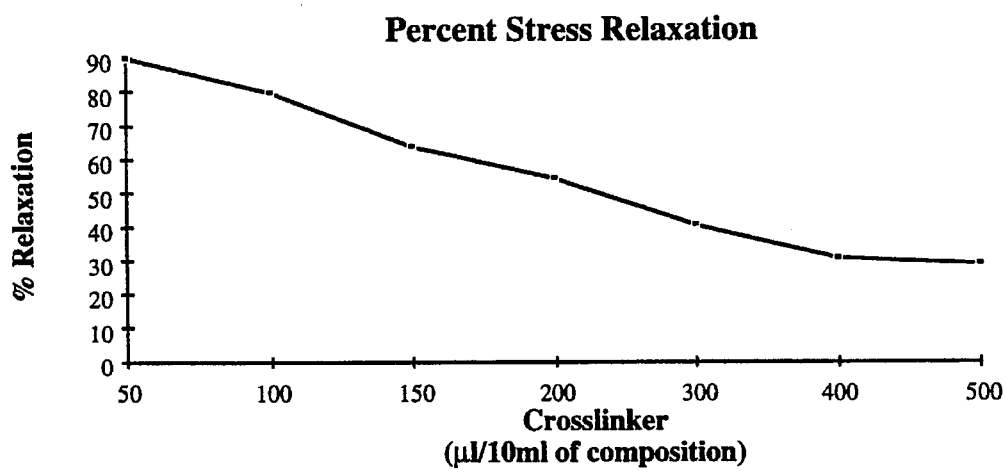
Figure 4:
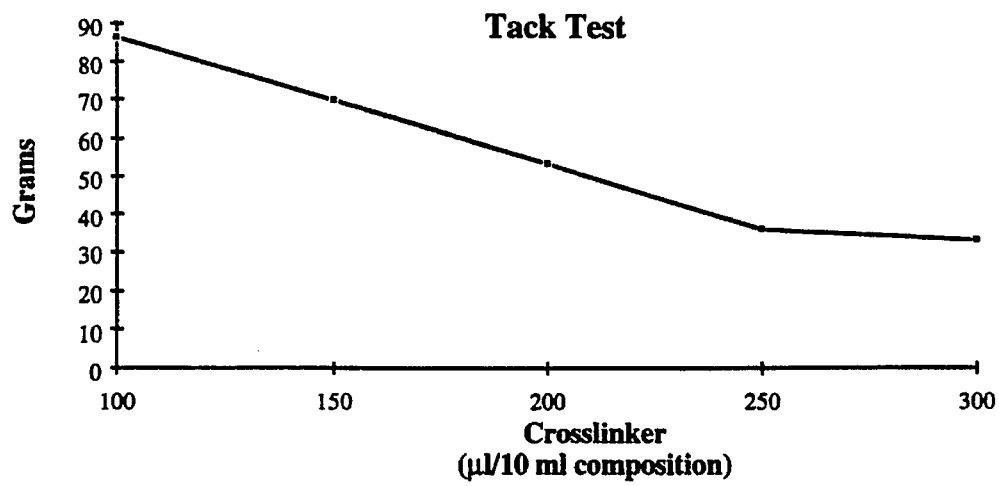

FIG. 3 Stress Relaxation Data

Percent stress relaxation was obtained for gels as described in FIG. 2 by dividing the difference between the peak and relaxed values by the peak value.

FIG. 4 Tack Data

Gels were cast in a cylindrical shape and pressed against an Amtek pressure gauge's 4.6 square cm probe for 10 seconds, and then gel retracted from the probe to obtain the peak tack value.

Figure 5:
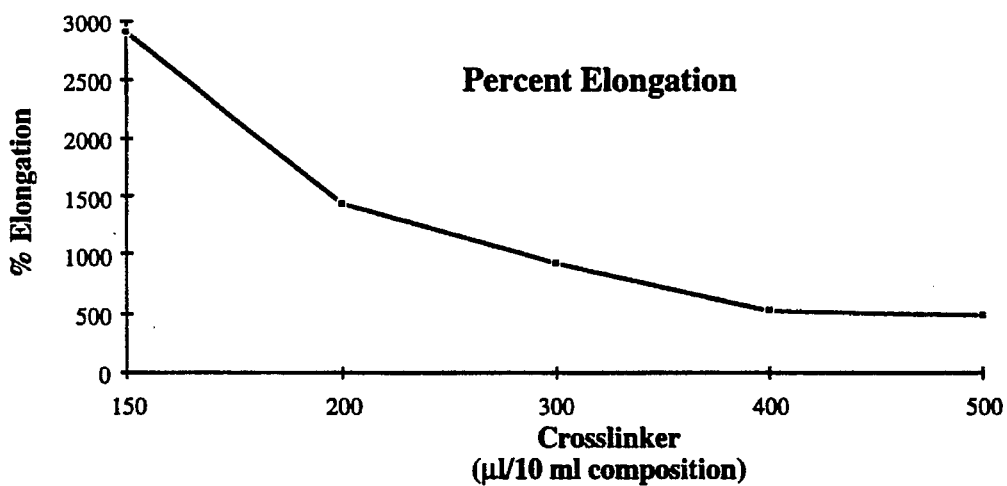

FIG. 5 Elongation Data

Gels were cast in a cylindrical shape and held by two retainers and then stretched until breakage; the percent elongation before breakage was measured.

Figure 6:
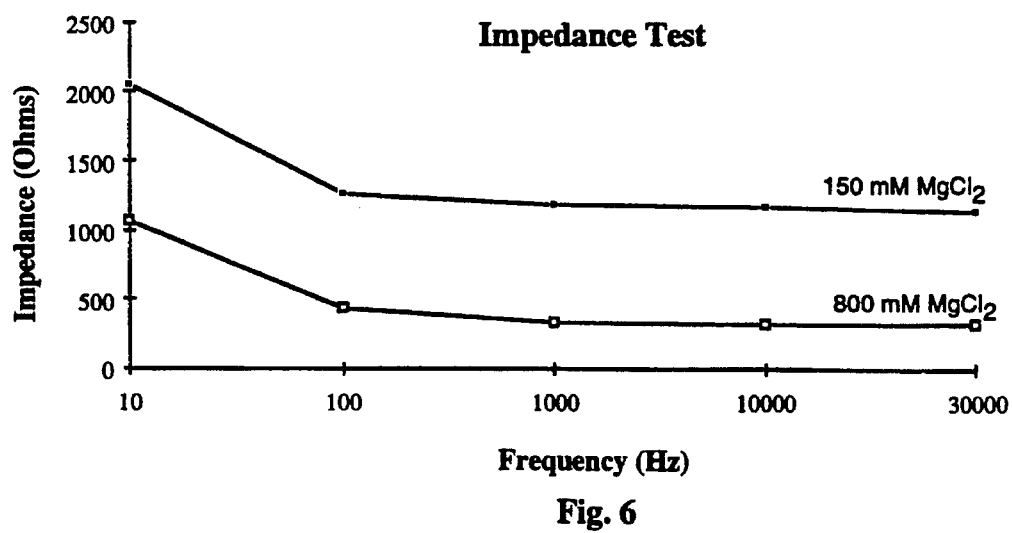

FIG. 6 Impedance vs. Frequency Data

Figure 1:
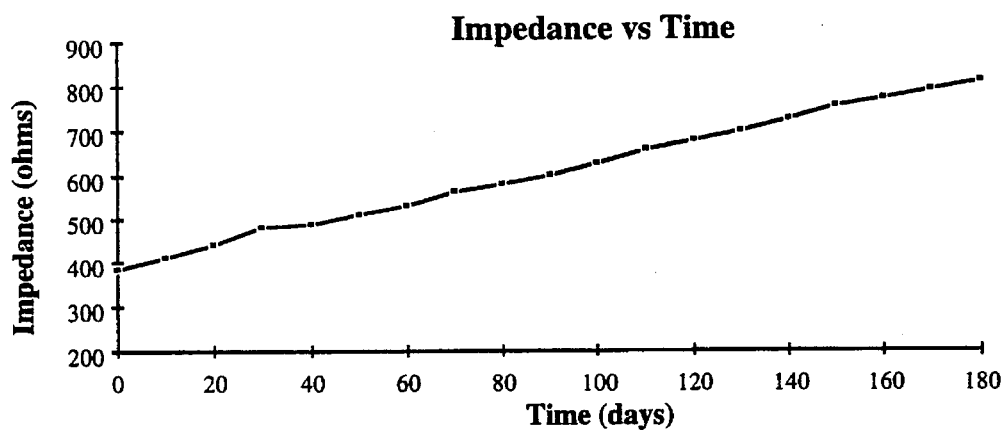
FIG. 1 Impedance vs. Time Data

As described in FIG. 1 except as a function of frequency.

DETAILED DESCRIPTION OF THE INVENTION

The invention's organic polymer crosslinkers comprise the general formula:

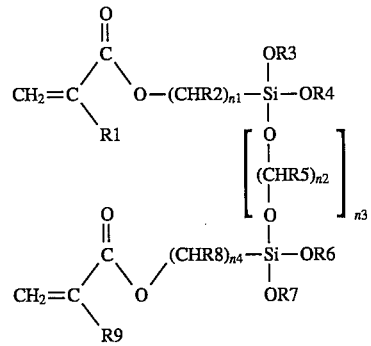

wherein each of R1–R9 comprises a one to four carbon alkyl group or hydrogen and each of n1–n4 is an integer from one to five, inclusive. R1–R9 alkyl groups may be further substituted, e.g. with hydroxyl, halide, carboxyl, amine, etc. groups. A wide variety of chemical substitutions may be made for R1–R9, depending upon specifically desired properties of the crosslinker and resultant polymer. Generally, substitutions are made to provide polymers useful as coatings in biomedical electrodes and sensors. Hence, substitutions should yield a crosslinker capable of providing a gel with the physical properties (e.g. tack, hardness, bulk resistivity, etc.) described below. Of course, substitutions must also be chemically compatible with the intended free-radical polymerization reaction. Hence, except for those of acrylate derivative groups destined for polymerization, the presence of substitutions containing unsaturated carbons are minimized and preferably avoided.

Generally, the crosslinker should retain substantial solubility in water, usually at least 0.1%, preferably at least 1%, more preferably at least 10% (w/v). Accordingly, "n" integer values and "R" groups providing water soluble crosslinkers are preferred and hydrophobic moieties such as unsubstituted long chain alkyl groups are avoided. Generally, at least one R1–R9 alkyl group comprises an alkyl, amine, hydroxyl, or carboxyl group. Preferably, a plurality of R groups are methyl or ethyl groups. Individually enumerated R groups can be variable within a given crosslinker. For example, where n2 is greater than one, R5 can alternate between a hydrogen and hydroxyl group with each repeat (i.e. $CH_2$—CHOH—$CH_2$—CHOH). Generally, n1 and n4 are smaller values when R2/R8 are hydrophilic and larger values (e.g. 4 or 5) where R2/R8 is other than hydrogen or unsubstituted alkyl. Similarly, smaller n2 and n3 values are associated with R5 substitutions with hydrogen or unsubstituted alkyls.

In a preferred embodiment, R1 and R9 are limited to hydrogen or methyl groups; R2 and R8 are hydrogen, methyl or substituted methyl groups such as methanol, formate, methyl amine, etc.; R3, R4, R6 and R7 are hydrogen, short alkyl, short substituted alkyl groups or acrylate derivatives such as trimethoxyalkylsilylacrylate; R5 is hydrogen or hydroxy. In a more preferred embodiment, R1 and R9 are methyl or hydrogen; R2 and R8 are hydrogen; R3, R4, R6 and R7 are methyl or ethyl or an amine, carboxyl, or alcohol derivative of either; R5 is a hydrogen; n1, n2, n3 and n4 are 2, 3 or 4, and the product of n2 and n3 is less than or equal to 12, and preferably less than or equal to 9. In a particularly preferred embodiment, R1, R3, R4, R6, R7 and R9 are each methyl groups, R2, R5 and R8 are each hydrogens, n1 and n4 are each three, n2 is two, and n3 is four. This particularly preferred crosslinker comprises the following chemical formula:

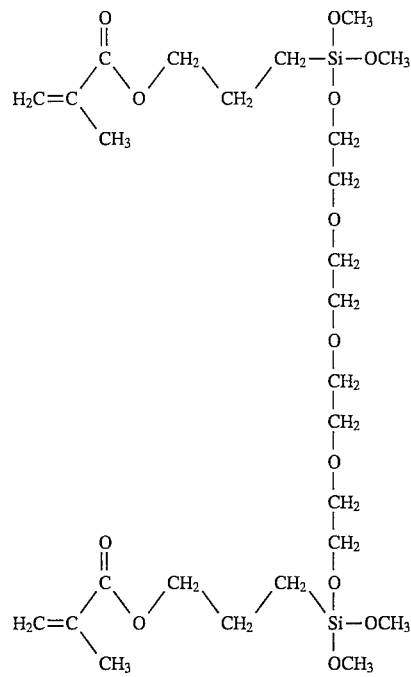

The crosslinkers of the invention find use in constructing organic polymer gels, especially polyacrylates, particularly polyacrylamides. Generally, these gels are formed from a solution comprising 2–60% (w/v) and preferably 5 to 30% (w/v) monomer (e.g. acrylate monomer or derivative thereof), 0.1–20% (w/v) and preferably 0.5–10% (w/v) crosslinker and 10–98% (w/v) and preferably 50–90% (w/v) an electrically conductive solution of salt in water or a water-miscible solvent (e.g. glycerol).

A preferred class of polymers are particularly suited to coating biomedical electrodes and sensors. These hydrogels combine high adhesive properties with good cohesive strength and resistance to drying without compromising the electrical properties of the gel. The precise composition of the gels depends upon the desired properties which will vary widely with the intended application, selected monomer and selected crosslinker. For example, for skin contacting electrodes, preferred properties of the gels include:

Bio compatibility: The gel is non-toxic, non-irritating and non-sensitizing when used in a physiologic electrode or sensor. When placed in direct contact with human skin, the host experiences no or negligible discomfort, pathology or immune sensitization specific to the chemical formulation of the gel. The gel is non-cytotoxic in in vitro cell culture tests and in vivo animal tests.

Thermal Stability: The gel is stable and functional in the subject electrodes from 0° C. to 40° C., and preferably from −40° C. to 70° C. without any phase separation. The water in the gel matrix is tightly bound to the polymer chain and essentially no (less than 10%, preferably less than 1%) free water in the matrix.

Electrical Properties: The polymer matrix can support a wide variety of salts and other electrolyte at high concentrations. Salt concentrations often exceed 1 M and gels with saturated levels of salts are readily made without compromising tack, adhesion or conformability; in contrast to prior art gels which typically 'salt out' under high concentrations of the electrolytes. The composition provides a superior gel with low impedance necessary for sensing and stimulation. These polymers generally have bulk resistivity of less than 1000 Ohms, preferably less than 250, more preferably less than 50 Ohms at 1 kHz, Adhesiveness: The gel is highly tacky to the skin under various conditions. The sensors and electrodes made with these compositions maintain their tack for extended time periods (e.g. at least about 2, preferably at least about 24, more preferably at least about 72 hours) on the patient. The adhesion is mild enough not to cause any local skin trauma when removed. Gels have tack between about 10 and 200 g, preferably between 20 and 150 g, more preferably between 30 and 100 g, Cohesiveness: The gel maintains highly cohesive polymer network. The nature of the crosslinker described in this invention with its dual mode of action allows one to have a very tacky gel that is integral. The gel does not leave any residue on the skin when removed. Gels have tensile strength between about 1 and 1000 g, preferably between 10 and 100 g, and are capable of elongation between 100 and 3000%, preferably between 150 and 200%, more preferably between 200 and 1000%.

Castability; The composition a conductive hydrogel with superior properties that can be cast in to a wide variety of shapes. Many prior art gels used in electrodes are pre-cast into sheets by radiation polymerization. This limits the usefulness of these gels to unsegmented planer electrodes. The present compositions allows the manufacturing of columnar electrodes with larger height to area ratios (e.g. HydroDot™, Physiometrix, Sunnyvale Calif.) and multisegmented electrodes (TriGel™, Physiometrix)

Conformability or Softness: Conformability can be maintained even with highly cohesive gel. High conformability of the gel also lowers the impedance at a skin interface. The gels have hardness between 30 g and 600 g, preferably between 60 and 500 g, more preferably between 120 and 400 g. and stress relaxation between 5 and 80%, preferably between 10 and 70%, more preferably between 20 and 60%.

Lower susceptibility to drying: The water in the polymer matrix formed by the composition described is tightly bound. Unlike matrices where the water is loosely held in the pockets created by the polymer, the water in the present compositions requires more energy to remove. This translates to a long shelf life in package (e.g. months to years) and a long (at least 4 hrs, preferably at least 24 hrs) "on-the-patient" use without change in the impedance.

Compatibility with substrates: The compositions are compatible with a variety of standard metals used in the medical electrodes and sensors like tin, silver, gold, etc., as well as aluminum. With prior art gels many conductor materials, especially aluminum, experience rapid oxidation or other corrosion. The gel does not promote corrosion of the metal and yet helps to maintain a low impedance. Sensors made with the gel composition provide excellent traces with high signal to noise ratio—usually noise is less than 1%, preferably less than 0.1%, more preferably less than 0.01% of signal peaks with less than 250, preferably less than 50, more preferably less than 10 μV peak-to-peak noise.

A wide variety of monomers are useful for these preferred hydrogels including water-soluble unsaturated amides and acids and their derivatives like acrylamide, methacrylamide, N-hyroxymethylacrylamide, acrylonitrile, acrylic acid, polyethylene oxide aceylates, etc. Preferred monomers include acrylates and derivatives thereof, especially acrylamide, methacrylamide, N-hydroxymethylacrylamide. Since gel macro-properties are significantly dependent upon the molar ratio of the monomer to the crosslinker, the percent by weight monomer typically increases with the molecular weight of the crosslinker.

Preferred crosslinkers include multifunctional oligo(polyhydroxyalkyl)silylmethacrylates. These may be formed by a limited trans-esterification of trimethoxyalkylsilylacrylate derivatives with polyhydroxyalkanes. Preferred crosslinkers are capable of linking the linear polymer generated by the bulk monomer by two distinct mechanisms: the multifunctional moieties copolymerize and covalently link different strands; and the polar silyl groups with its partially negatively charged oxygen in the adjacent chains are anchored by coordinate bonds in the presence of metal ions. These bonds give the hydrogel very high cohesive strength without compromising its adhesive strength and softness.

The polymer hydrogels can be formed from a precursor monomer and crosslinker in a polar solvent and various added salt by any convenient way, including photochemical and/or catalyst/initiator initiated polymerization. The solvent is usually water or a water-based solution in which the water is usually present between 20 and 100% by wt. Alcohols, including polyhydric alcohols (e.g. glycerol, tetraethylene and propylene glycol, etc.) and/or other co-solvents may be present in the range of 5 to 80% by wt.

Salts which provide for electrical conductance (e.g. chloride, bromide, iodide, acetate, borate, etc. salts of sodium, potassium, magnesium, etc.) are typically present in 0.2 to 10% by wt. Typically, the electrolyte comprises at least one metal ion that can accept multiple crosslinker ligands. Such ions are usually multivalent cations such as Mg, Ca, Sn, Fe, Mn, etc. The solution may also contain additional salts and/or buffers (e.g. ethylene diamine tetraacetic acid (EDTA), sodium acetate, Tris (hydroxymethyl)ammonium acetate, etc.; 0 to 10% by wt.) to maintain the pH of gel within selected range, typically a pH between 5.3 and 8.9. Of course, the pH controlling salt can also be the electrolyte that confers electrical conductivity to the gel.

Photopolymerizable compositions comprise a photo-initiator like Irgacure 184, Durocur 2959, etc., usually at less than 1% by wt. When polymerization is initiated by an initiator/catalyst the composition usually comprise a peroxy compound such as potassium persulfate as the initiator and amines like tetramethylethylenediamine as the catalyst, again at less than 1% by wt.

The gel compositions may also contain antimicrobial agents to guard against the growth of bacteria and fungi (e.g. Hexetidine 99 (Angus)). These anti microbial agents are present in less than 1% by wt.

The invention also provides for using the subject polymers in electrodes and sensors, e.g. the subject polymers are interposed between the skin of a patient and an electrical conductor to improve electrical current transfer. Copending concurrently-filed application Ser. No. 243,226, filed May 16, 1994, now U.S. Pat. No. 5,520,683, describes the production, design and use of such electrodes. Such electrodes and sensors have a wide variety of applications in medicine, material sciences, environmental sciences, etc. For example, biomedical electrodes and sensors are used in monitoring (e.g. EEG, etc.), discharging current (e.g. surgery, defibrilators, etc.), etc.

The following examples are offered by way of illustration and not by way of limitation.

PREFERRED EMBODIMENTS

I. Compositions polymerized with initiator/catalyst

In these examples, the polymerization is triggered by the addition of the amine to the homogeneous solution of the composition. The gelling time is controlled by the amount of the catalyst and the initiator.

Example 1

In this example, the composition of the gel forming precursor comprises of 5 to 25% acrylamide, 0.2 to 7% tetraethylene glycol α–ω bis(dimethoxysilylpropylmethacrylate), 0.4 to 8% of magnesium chloride (or 0.2 to 6% sodium chloride) and the solvent consists 0 to 75% by wt of glycerol and 25 to 100% by wt of water. The formulation also contained less than 1% each of Hexetidine 99 (bacteriostat and fungistat), ammonium persulfate (APS) (initiator) and Tetramethylethylenediamine (TEMED) (catalyst).

Example 2

The gel composition with controlled pH (4 to 9) consists of

| | |
|---|---|
| Acrylamide | 5 to 25% |
| tetraethylene glycol-α-ω bis(dimethoxysilylpropylmethacylate) | 0.2 to 7% |
| Sodium chloride | 0.2 to 6% |
| Glycerol | 20 to 80% |
| Ethylenediamine tetraacetic acid (EDTA) | 0 to 2% |
| Hexetidine 99 | <1% |
| Ammonium persulfate (APS) | 1% |
| TEMED | 1% |

Example 3

Another gel composition with controlled pH (4 to 9) consists of

| | |
|---|---|
| Acrylamide | 5 to 25% |
| tetraethylene glycol-α-ω bis(dimethoxysilylbutylacrylate) | 0.2 to 7% |
| Magnesium chloride | 0.2 to 6% |
| Glycerol | 20 to 80% |
| Hexetidine 99 | <1% |
| Ammonium persulfate (APS) | 1% |
| TEMED | 1% |
| Tris(hydroxymethyl)ammonium Acetate | 0 to 3% |

Example 4

| | |
|---|---|
| methacrylamide | 5 to 25% |
| tetraethylene glycol-α-ω bis(dimethoxysilylpropylmethacrylate) | 0.2 to 7% |
| Sodium chloride | 0.2 to 6% |
| Glycerol | 20 to 80% |
| Hexetidine 99 | <1% |
| Ammonium persulfate (APS) | 1% |
| TEMED | 1% |

Example 5

| | |
|---|---|
| N-hydroxymethylacrylamide | 5 to 25% |
| tetraethylene glycol-α-ω bis(methoxy, (2-ethoxy-2'-hydroxyethyl)ethoxysilylpropylmethacrylate) | 0.2 to 7% |
| Sodium chloride | 0.2 to 6% |
| Glycerol | 20 to 80% |
| Hexetidine 99 | <1% |
| Ammonium persulfate (APS) | 1% |
| TEMED | 1% |

Example 6

| | |
|---|---|
| methacrylate | 5 to 25% |
| triethylene glycol-α-ω bis(dimethoxysilylpropylmethacrylate) | 0.2 to 7% |
| Sodium chloride | 0.2 to 6% |
| Glycerol | 20 to 80% |
| Hexetidine 99 | <1% |
| Ammonium persulfate (APS) | 1% |
| TEMED | 1% |

II. Compositions polymerized with photoinitiator

The gels in these examples are formed by use of high intensity tungsten lamp with 3000 μW/cm$^2$. Typically the gels are formed in less than 30 sec of exposure.

Example 7

| | |
|---|---|
| Acrylamide | 5 to 25% |
| tetraethylene glycol-α-ω bis(diethoxysilylethylmethacrylate) | 0.2 to 7% |
| Sodium chloride | 0.2 to 6% |
| Glycerol | 20 to 80% |
| Ethylenediamine tetraacetic acid(EDTA) | 0 to 2% |
| Hexetidine 99 | <1% |
| Irgacure 184 | <1% |

| | |
|---|---|
| Acrylamide | 5 to 25% |
| tetraethylene glycol-α-ω bis(dimethoxysilylpropylmethacrylate) | 0.2 to 7% |
| Magnesium Chloride | 0.4 to 8% |
| Glycerol | 20 to 80% |
| Ethylenediamine tetraacetic acid(EDTA) | 0 to 2% |
| Hexetidine 99 | <1% |
| Irgacure 194 | <1% |

Example 9

The gel composition with controlled pH (4 to 9) consists of

| | |
|---|---|
| Acrylamide | 5 to 25% |
| tetraethylene glycol-α-ω bis(dimethoxysilylpropylmethacrylate) | 0.2 to 7% |
| Sodium chloride | 0.2 to 6% |
| Glycerol | 20 to 80% |
| Ethylenediamine tetraacetic acid(EDTA) | 0 to 2% |
| Hexetidine 99 | <1% |
| Irgacure 184 | <1% |

Example 10

Another gel composition with controlled pH (4 to 9) consists of

| | |
|---|---|
| Acrylamide | 5 to 25% |
| tetraethylene glycol-α-ω bis(dimethoxysilylpropylmethacrylate) | 0.2 to 7% |
| Magnesium chloride | 0.2 to 6% |
| Glycerol | 20 to 80% |
| Hexetidine 99 | <1% |
| Irgacure 184 | <1% |
| Tris(hydroxymethyl)ammonium Acetate | 0 to 3% |

III. Particularly Preferred Gel Compositions (range followed by parenthetical example)

Example 11

| Acrylamide | 4 to 20 (15.56)% |
|---|---|
| tetraethylene glycol-α-ω bis(dimethoxysilylpropylmethacrylate) | 0.4 to 8 (1.95)% |
| Sodium chloride | 0.2 to 5 (4.51)% |
| Glycerol | 0 to 80 (38.91)% |
| Ammonium persulfate (APS) | 0.1 to 0.05 (0.08)% |
| TEMED | 0.1 to 0.05 (0.08)% |
| Water | 20 to 75 (38.91)% |

Example 12

| Acrylamide | 4 to 20 (15.13)% |
|---|---|
| tetraethylene glycol-α-ω bis(dimethoxysilylpropylmethacrylate) | 0.4 to 8 (1.89)% |
| Magnesium chloride | 0.2 to 8 (7.21)% |
| Glycerol | 0 to 80 (37.81)% |
| Ammonium persulfate (APS) | 0.1 to 0.05 (0.08)% |
| TEMED | 0.1 to 0.05 (0.08)% |
| Water | 20 to 75 (37.81)% |

All publications and patent applications cited in this specification are herein incorporated by reference as if each individual publication or patent application were specifically and individually indicated to be incorporated by reference. Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. An organic polymer comprising a crosslinker comprising the general formula:

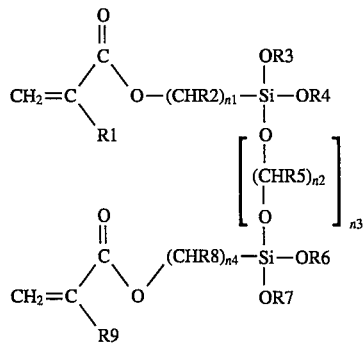

wherein each of R1–R9 comprises a one to four carbon alkyl group or hydrogen and each of n1–n4 is an integer from one to five, inclusive, wherein at least one R1–R9 alkyl group comprises an amine, hydroxyl, or carboxyl group.

2. An organic polymer comprising a crosslinker comprising the general formula:

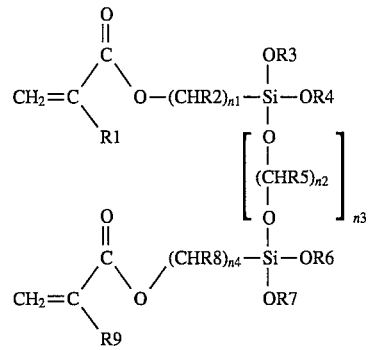

wherein each of R1–R9 comprises a one to four carbon alkyl group or hydrogen and each of n1–n4 is an integer from one to five, inclusive, wherein R1, R3, R4, R6, R7 and R8 are each methyl groups, R2, R5 and R8 are each hydrogens, n1 and n4 are each three, n2 is two, and n3 is four.

3. An organic polymer comprising a crosslinker comprising the general formula;

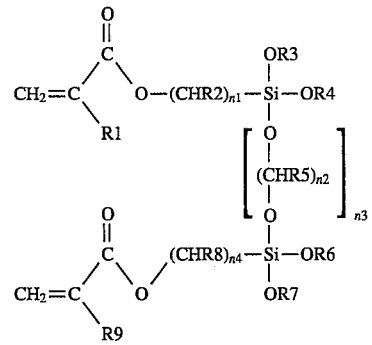

wherein each of R1–R9 comprises a one to four carbon alkyl group or hydrogen and each of n1–n4 is an integer from one to five, inclusive, wherein said polymer is polyacrylamide.

4. An organic polymer comprising a crosslinker comprising the general formula:

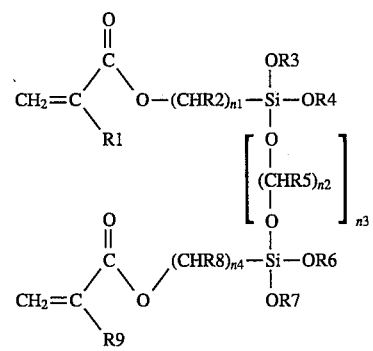

wherein each of R1–R9 comprises a one to four carbon alkyl group or hydrogen and each of n1–n4 is an integer from one to five, inclusive, comprising 2–50% (w/v) acrylamide and 0.1–20% (w/v) crosslinker.

5. An organic polymer comprising a crosslinker having the general formula:

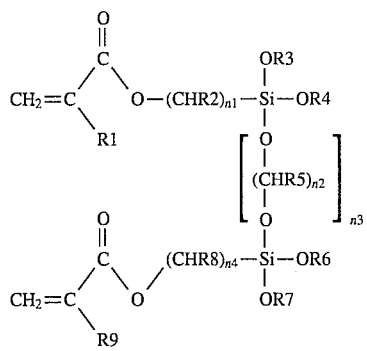

wherein each of R1–R9 comprises a one to four carbon alkyl group or hydrogen and each of n1–n4 is an integer from one to five, inclusive, and comprising 10–30% acrylamide (w/v), 0.5–5% (w/v) said crosslinker and 65–90% (w/v) an electrically conductive solution of a salt in water and/or a water-miscible solvent.

6. An organic polymer according to claim 5 wherein at least one R1–R9 alkyl group comprises an amine, hydroxyl, or carboxyl group.

7. An organic polymer according to claim 5, wherein R1, R3, R4, R6, R7 and R9 are each methyl groups, R2, R5 and R8 are each hydrogens, n1 and n4 are each three, n2 is two, and n3 is four.

8. An organic polymer according to claim 5, wherein said crosslinker is at least 0.1% (w/v) soluble in water.

9. A substantially homogeneous electrically conductive hydrogel formed by thermal or photo induced free radical polymerization of precursor comprising a water soluble unsaturated substituted amide or acid monomer, multifunctional crosslinker comprising the general formula:

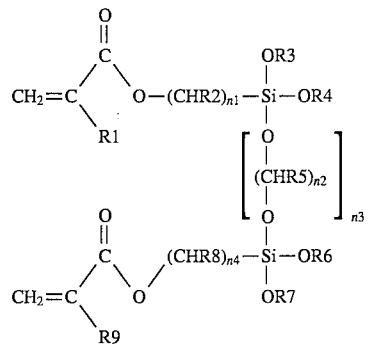

wherein each of R1–R9 comprises a one to four carbon alkyl group or hydrogen and each of n1–n4 is an integer from one to five, inclusive, polymerization initiator and electrically conducting solution comprising 10 to 95% by weight water miscible polar solvent and 1 to 10% by weight salt.

10. An organic polymer according to claim 9, wherein at least one R1–R9 alkyl group comprises an amine, hydroxyl, or carboxyl group.

11. An organic polymer according to claim 9, wherein R1, R3, R4, R6, R7 and R9 are each methyl groups, R2, R5 and R8 are each hydrogens, n1 and n4 are each three, n2 is two, and n3 is four.

12. An organic polymer according to claim 9, wherein said crosslinker is at least 0.1% (w/v) soluble in water.

* * * * *